United States Patent [19]
Sime et al.

[11] 3,792,716
[45] Feb. 19, 1974

[54] INLINE VALVE WITH REVERSE PRESSURE CLOSING MEANS

[75] Inventors: Malcolm A. Sime, Des Plaines; Eugene Lambeau, Park Ridge; Vijay K. Zadoo, Mount Prospect, all of Ill.

[73] Assignee: Vapor Corporation, Chicago, Ill.

[22] Filed: June 13, 1973

[21] Appl. No.: 369,589

[52] U.S. Cl. .............................. 137/492, 137/220
[51] Int. Cl. ......................................... F16k 31/363
[58] Field of Search ... 137/219, 220, 221, 485, 488, 137/492, 492.5, 496

[56] References Cited
UNITED STATES PATENTS
2,085,893  7/1937  Boland ............................. 137/219
2,919,714  1/1960  Mrazek ............................. 137/220

Primary Examiner—Alan Cohan
Assistant Examiner—Gerald A. Michalsky
Attorney, Agent, or Firm—Lloyd L. Zickert

[57] ABSTRACT

An inline valve for a pressurized fluid system including a sleeve type closure member, a pilot valve and a control valve wherein during normal flow operation the control valve operates to open and close the sleeve type closure member and in the event of pressure reversal when the valve is open the pilot valve will cause the valve to close.

4 Claims, 3 Drawing Figures

INLINE VALVE WITH REVERSE PRESSURE CLOSING MEANS

This invention relates in general to a valve for a pressurized fluid system, and more particularly to an inline valve having means to cause closing in the event of pressure reversal.

Heretofore, sleeve type inline valves have been known which are pneumatically operable to open and close on command. However, it has not been known to provide an inline valve usable in a pressurized air duct system that will automatically close or stay closed in the event of a pressure reversal.

The inline valve of the present invention is especially useful in a pressurized air duct system which due to causes unrelated to the valve may encounter a pressure reversal where the downstream or outlet pressure exceeds the upstream or inlet pressure. Accordingly, the present valve, in order to stem such a pressure reversal which could be damaging, includes an automatic pressure reversal checking means completely independent of the normal opening and closing means to close the valve automatically in the event that a pressure reversal is encountered. Heretofore, pressure reversal problems have necessitated installing a separate check valve, or incorporating a check valve with the shutoff valve as shown in U. S. Pat. No. 3,297,047. The present invention eliminates the necessity of a separate check valve or a structure as shown in said patent.

It is therefore an object of the present invention to provide a new and improved inline valve which is operable on command to open and close and which will stay closed or close automatically in the event of a pressure reversal.

Another object of this invention is in the provision of an inline valve automatically closable on pressure reversal which includes a pilot valve and a control valve pneumatically interconnected with the pressure chambers of the valve to allow normal opening and closing by the control valve in the event of normal air flow and automatically closing in the event of a pressure reversal by the pilot valve which overrides the control valve.

Other objects, features and advantages of the invention will be apparent from the following detailed disclosure taken in conjunction with the accompanying sheets of drawings, wherein like reference numerals refer to like parts, in which.

Figure 1:
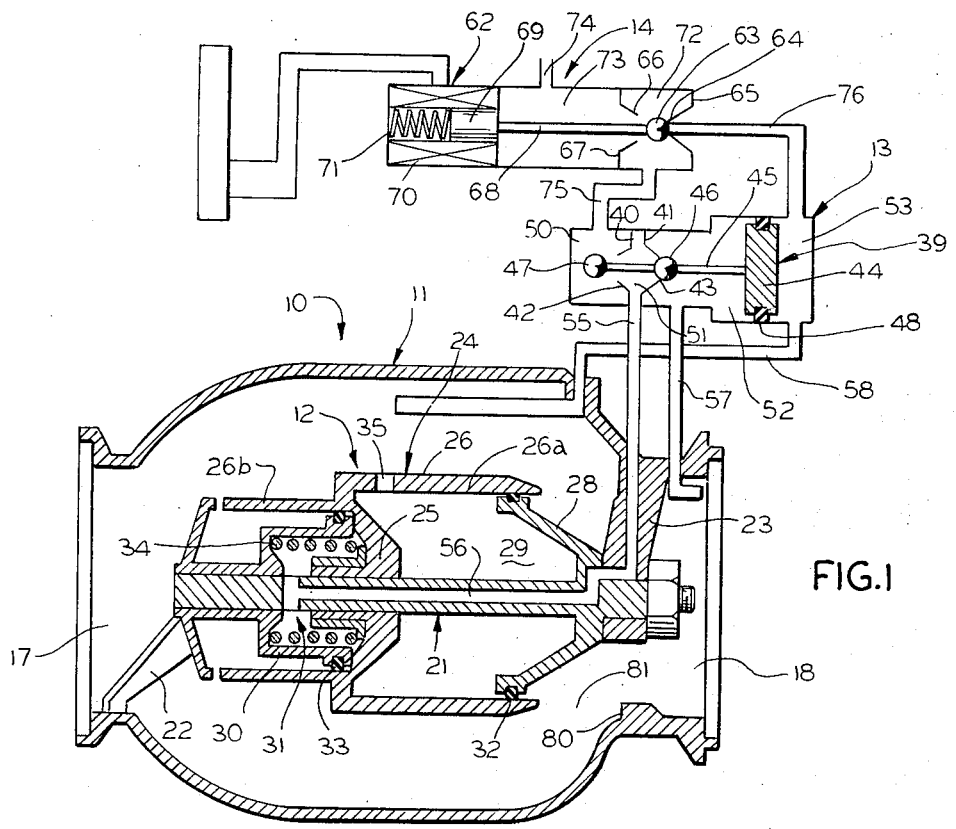
FIG. 1 is a schematic diagram of the valve according to the invention illustrating the valve in open position with normal air flow.

Referring now to the drawings, and particularly to FIG. 1, the valve of the present invention includes a main valve 10 having a tubular valve body 11 with a valve closure assembly 12 in the valve body, a pilot valve 13, and a control valve 14. While it is shown that the pilot valve and control valve appear separate, it will be appreciated that they will be integrally formed in the housing of the valve body 11 in actual practice. The control valve 14 operates to drive the closure assembly 12 during normal air flow to open and close the main valve 10, while the pilot valve 13 will operate to cause the closure assembly 12 to close the valve in the event of a pressure reversal when the control valve 14 commands the valve to be open. It should be further appreciated that in the event the control valve 14 commands the closure assembly to be in position to close the main valve 10 and a pressure reversal is encountered, the pilot valve will operate to prevent opening of the valve closure assembly 12.

The valve body 11 is tubular and includes an inlet 17 and an outlet 18 coaxially aligned therewith. It can be appreciated that the inlet or upstream pressure is that at the inlet and around the closure assembly ahead of the outlet while the outlet or downstream pressure is that at the outlet 18.

The closure assembly 12 includes a sleeve guide rod 21 which is axially extending within the tubular valve body 11 and supported at its opposite ends by support spiders 22 and 23. Slidably mounted on the guide rod 21 is a piston and sleeve unit 24 which includes a piston 25 and a sleeve 26. The sleeve 26 includes a section 26a coacting with an annular wall 28 to define the pressure chamber 29 and a section 26b coacting with an annular wall 30 to define a pressure chamber 31. A suitable sealing ring 32 on the periphery of the annular wall 28 coacts with the sleeve section 26a to provide an air seal, while a seal 33 is provided on the periphery of the wall 30 to coact with the sleeve section 26b and provide a suitable air seal. A sleeve return spring 34 is mounted in the pressure chamber 31 to assist in returning the sleeve 26 to closed position in the event of a command by the control valve that it be closed or in the event of operation of the pilot valve in the event of pressure reversal. A pressure port 35 is provided in the sleeve section 26a to bleed inlet pressure into the chamber 29 continually. Essentially, the sleeve 24 will open pneumatically and close mechanically by the spring 34.

The pilot valve 13 includes a casing 38 having movable therein a piston assembly 39. Partitions 40 and 41 are arranged in the assembly with ports 42 and 43. The piston assembly includes a piston 44 having a piston rod 45 extending therefrom and mounting thereon poppets 46 and 47 which respectively coact with the ports 43 and 42. A piston ring 48 is provided on the piston for coacting with the casing to seal therewith. The partitions 40 and 41, together with the piston 44, coact with the casing to define first, second, third and fourth chambers 50, 51, 52 and 53. Pneumatic connections between the main valve 10 and the pilot valve include connection of the second chamber 51 through a passageway 55 and a passageway 56 to the pressure chamber 31, connection of the third chamber 52 to the downstream pressure or the outlet through passageway 57, and connection of the fourth chamber 53 to the inlet pressure through passageway 58.

The control valve 14 includes a casing 61 having a solenoid 62 for operating a poppet 63 into seated position with a port 64 of end wall 65 or a port 66 of partition 67. The poppet is mounted on a rod 68 connected to the plunger or armature 69 of the solenoid which is activated by a coil 70 of the solenoid. In de-energized position a return spring 71 moves the poppet 63 into seated position with the port 64. A first chamber 72 is defined between the end wall 65 and partition 67, while a second chamber 73 is defined between the partitions 67 and the solenoid 62. The second chamber 73 is connected to ambient by the vent 74. Pneumatic connections between the control valve and the pilot valve include interconnection of the chamber 72 of the control valve to the first chamber 50 by a passageway 75 and interconnection of the port 64 to the fourth chamber 53 through a passageway 76. Accordingly, it can be appreciated that the control valve is connected pneumatically to the main valve only through the pilot valve.

Figure 3:
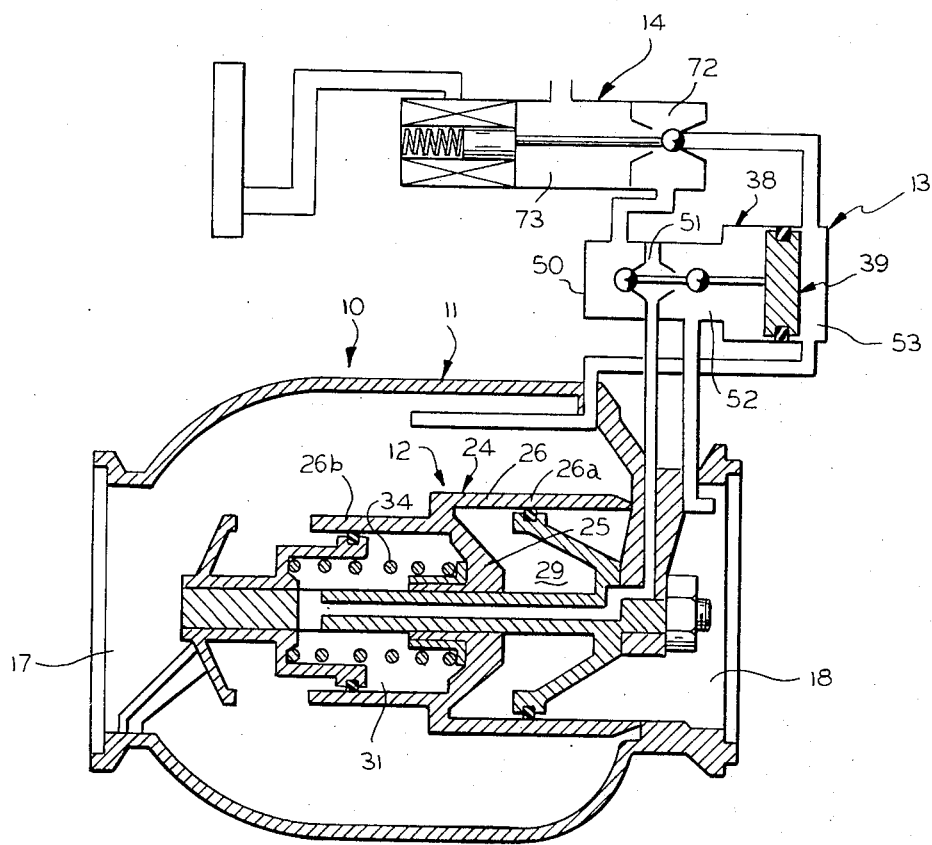
FIG. 3 is a schematic diagram of the valve showing the control valve in condition to command opening of the valve and where a pressure reversal exists operating the pilot valve to cause closing of the valve.

During the mode of operation where normal air flow direction is obtained between the inlet and outlet, and in this case the inlet pressure will be greater than the outlet pressure, the closure assembly 24 can be opened and closed by operation of the control valve 14 when the pilot valve 13 is in the position as shown in FIG. 1. With a pressure reversal the pilot valve shifts to the position shown in FIG. 3 to operate the closure assembly 24 into closed position if it is open or to maintain it in closed position otherwise.

With the solenoid 62 de-energized and before air is supplied, the valve is closed due to the force of the return spring 34 in pressure chamber 31 which pushes the sleeve to the right against the valve seat 80, thereby closing the valve. It can be appreciated that an opening 81 is defined between the leading edge of the sleeve section 26a and the seat through which air may flow when the valve is in open position. Thereafter, upon the application of upstream air to the valve, the fourth chamber 53 of the pilot valve is pressurized more than the third chamber 52, resulting in a greater force on the right side of the piston 44 forcing the piston assembly to the left and connecting the first chamber 50 to the second chamber 51. The de-energized solenoid valve also seals off pressure from the fourth chamber 53 by virtue of the poppet 63 being seated against port 64. Pressure chamber 31 is now open to ambient pressure through the passageway 56, passageway 55, chambers 51 and 50 in the pilot valve, passageway 75, chambers 72 and 73 in the control valve and the vent 74. Pressure then increases in the pressure chamber 29 of the main valve through the pressure port 35 which acts on the piston 25, which in turn is opposed by the ambient pressure in the pressure chamber 31 and the force of the sleeve return spring 34. The resultant pressure in the pressure chamber 29 is greater than the resultant pressure in pressure chamber 31, thereby moving the sleeve 26 left and opening the valve and opening 81. The valve will then thereafter remain open as long as the upstream pressure remains above the critical minimum pressure and the solenoid 62 remains de-energized.

Figure 2:
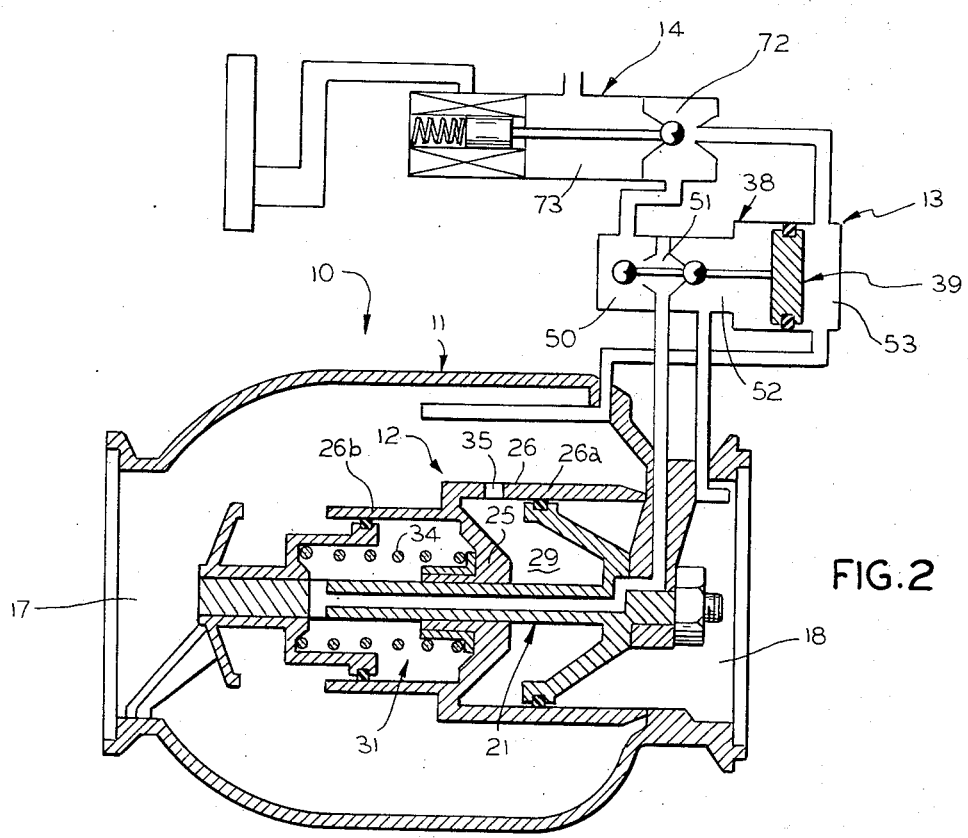
FIG. 2 is a schematic diagram of the valve showing the valve in closed position with normal air flow.

With normal air flow conditions, the valve will close on command when the solenoid 62 is energized as it moves the plunger 69 to the left unseating the poppet 63 from the port 64 and seating it on port 66, thereby cutting off the air flow path from the ambient to the pressure chamber 31. At the same time an air path is opened from the inlet pressure to the pressure chamber 31 by the path of the passageway 58, the fourth chamber 53 of the pilot valve, the passageway 76, port 64, the chamber 72 in the control valve, the passageway 75, the first chamber 50 in the pilot valve and the passageways 55 and 56. Inasmuch as the pressure differential across the piston 44 does not change, the piston assembly 39 in the pilot valve remains in the same position, which is the extreme left position. The increased pressure in pressure chamber 31, plus the compressed spring force of the sleeve return spring 34 is greater than the opposing force in the pressure chamber 29 forcing the sleeve 26 to move to the right and shut off air flow through the valve and close the opening 81. The positions of the valves when the solenoid is energized and the valve is closed is shown in FIG. 2.

In the event of a pressure reversal where the pressure at the outlet is greater than the pressure at the inlet and where the solenoid is de-energized, a greater pressure at the outlet than at the inlet will act on the left side of the piston 44 and drive the piston assembly 39 to the right by virtue of the greater pressure differential across the piston to cause closing of the port 42 and opening of the port 43, thereby closing the air path between the first and second chambers 50 and 51 of the pilot valve, while at the same time opening an air path between the second and third chambers 51 and 52 of the pilot valve. This permits the dowstream pressure to traverse through the passageway 57, third chamber 52 and the second chamber 51 of the pilot valve, and through the passageways 55 and 56 into the pressure chamber 31 which imposes a force in the chamber resulting in closing of the sleeve 26. Thus, the valve is automatically closed upon pressure reversal and cannot be opened unless the upstream pressure exceeds the downstream pressure. Thereafter, in the event of a signal to the control valve 14 to open the valve, nothing will happen inasmuch as the pilot valve essentially overrides the control valve under a reverse pressure condition. Accordingly, it can be seen that the valve will automatically close upon the pressure reversal or stay closed on a pressure reversal in the event that a signal is imparted to the control valve 14 to open the valve.

It can be appreciated that any type of mechanism may be utilized in the control valve 14 in order to operate the movement of poppet 63. It can be further appreciated that the exact structure of the sleeve assembly in the main valve may vary without departing from the scope of the invention. Further, the automatic pressure reversal closing feature may be incorporated in an inline shut-off valve of the usual type, a combination inlet shut-off and check valve, or into any other variation of inline valve.

It will be understood that modifications and variations may be effected without departing from the scope of the novel concepts of the present invention, but it is understood that this application is to be limited only by the scope of the appended claims.

The invention is hereby claimed as follows:

1. An inline valve for a pressurized air duct system comprising a tubular body having an inlet and an outlet axially aligned therewith, means defining an opening through the body between the inlet and outlet, a movable closure member coacting with said opening to selectively open and close the valve, a piston connected to said closure member, means defining first and second pressure chambers on opposite sides of said piston, spring means applying a spring force to the piston to urge the closure member into closed position to close the opening, a pressure port continuously communicating said second pressure chamber to the inlet pressure, control means operable during normal air flow through the valve to on command selectively connect said first pressure chamber to ambient to cause the closure member to move to open position or to inlet pressure to cause the closure member to move to closed position, and pilot means pneumatically connected between the control means and the valve for overriding the control means and connecting said first pressure chamber to the outlet pressure upon pressure reversal to cause the closure member to move to closed position or to maintain the closure member in closed position.

2. An inline valve as defined in claim 1, wherein said pilot means includes a casing, a pilot piston movable in said casing, first and second poppets connected to and movable with said pilot piston, first and second partitions in the casing having first and second ports coacting with said first and second poppets, said first partition defining with one end of the casing a first chamber, said partitions defining a second chamber, said second partition defining with said piston a third chamber, said pilot piston defining with the end of the casing a fourth chamber, means connecting said third chamber to the outlet pressure, and means connecting said fourth chamber to the inlet pressure.

3. An inline valve as defined in claim 2, wherein said control means includes a control valve including a casing having a control poppet movable therein, a partition in the casing having a first control port therein coacting with the control poppet, a second control port coacting with the control poppet and means connecting same to said fourth chamber of said pilot valve, said partition defining first and second control chambers, said first and second control ports leading from said second control chamber, means venting said first control chamber to ambient, means connecting said second control chamber to said first chamber of said pilot valve, and means for moving said control poppet to either open said first control port and close said second control port or to close said first control port and open said second control port to open and close the valve during normal air flow, and wherein duct pressure reversal will automatically shift the pilot piston to connect the outlet pressure to said first pressure chamber to close the valve.

4. An inline valve as defined in claim 3, wherein said means for moving said control poppet includes a solenoid.

* * * * *